No. 879,328. PATENTED FEB. 18, 1908.
J. M. SCHINNER.
BELT TIGHTENER.
APPLICATION FILED AUG. 5, 1907.
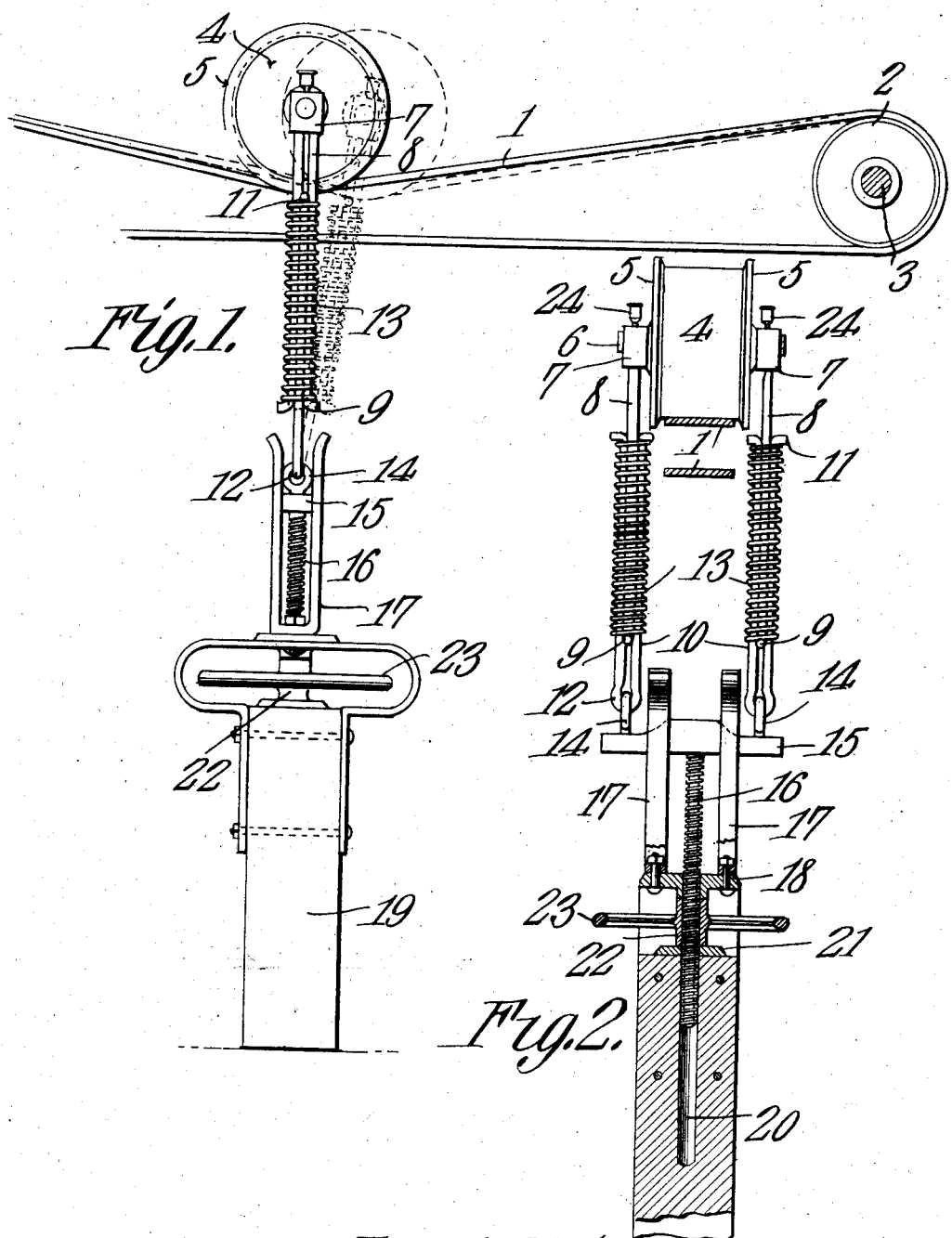
Joseph M. Schinner, Inventor

UNITED STATES PATENT OFFICE.

JOSEPH M. SCHINNER, OF MARSHFIELD, WISCONSIN.

BELT-TIGHTENER.

No. 879,328.  Specification of Letters Patent.  Patented Feb. 18, 1908.

Application filed August 5, 1907. Serial No. 387,123.

*To all whom it may concern:*

Be it known that I, JOSEPH M. SCHINNER, a citizen of the United States, residing at Marshfield, in the county of Wood and State of Wisconsin, have invented a new and useful Belt-Tightener, of which the following is a specification.

This invention relates to improvements in belt tighteners, and its object is to provide a belt tightener which is responsive to variations of load upon the belt to increase the tension thereof when the load is augmented and to relieve the tension when the load is lessened, so that the strain upon the belt is practically commensurate with the load.

The invention consists essentially in a pulley arranged to engage a power belt, and this pulley is mounted upon journal bearings elastically connected to a fixed point of support, so that the initial tension of the pulley upon the belt may be adjusted. There is, however, a hinge connection between the elastic support of the pulley and the fixed point of support, so arranged that the hinge is active in the direction of travel of the belt.

In order to place the belt tightening pulley under initial tension, the elastic supports are connected to the fixed support through a threaded rod and hand wheel, so that by a proper manipulation of the hand wheel the pulley may be brought into such relation to the belt as to tighten the same to the desired degree, depending upon the resistance of the elastic connections.

The invention will be best understood by reference to the following description, taken in connection with the accompanying drawings forming a part of this specification, in which, Figure 1 is a side elevation of the improved belt tightener. Fig. 2 is a view taken at right angles to that shown in Fig. 1, with some parts in section and other parts in elevation.

Referring to the drawings, there is shown a power belt 1 passing over a pulley 2 mounted upon the shaft 3, which pulley and shaft may constitute either the drive or driven elements of the power transmitting mechanism, including the belt 1. Arranged to engage one strand of the belt 1, in the particular instance shown, the upper strand, assuming that the belt is running horizontally, is an idler pulley 4 having side flanges 5 between which the belt passes, the flanges 5 serving to maintain the pulley in operative relation to the belt. The pulley is provided with an axle or pintle 6 the ends of which engage in journal boxes 7 each upon the ends of two parallel rods 8 having their other ends out-turned, as shown at 9. Arranged at right angles to these rods 8 are other rods 10 arranged to embrace the rods 8 midway between the two members of each pair, and the ends of these rods 10 are out-turned, as shown at 11, while the intermediate points or yokes constitute eyes 12, each pair of rods 8 having a matching pair of rods 10 arranged to engage the rods 8 in a plane at right angles to the plane of said rods 8, so that one pair of rods 8 acts as a guide to the corresponding pair of rods 10 and the rods are free to slide longitudinally one on the other, but at the same time are not liable to become disengaged one from the other. Surrounding the rods 8 and 10 are helical springs 13 abutting against the out-turned ends 9 of the rods 8 and the out-turned ends 11 of the rods 10. The action of these spring is such as to tend to cause the ends 9 of the rods 8 to move away from the ends 11 of the rods 10.

The eyes 12 engage in other eyes 14 upon the ends of the cross head 15 to the center of which latter there is connected a screw rod 16. The cross head 15 enters between guides 17 secured on the upper end of a yoke 18, the two ends of which latter are connected to a post 19 fast on some fixed support, such, for instance, as the floor, or ceiling, or side walls. But in the present instance it will be considered that the post 19 rises from the floor.

The rod 16 passes downward through the yoke 18 and into a perforation 20 in the post 19, and between the top member of the yoke 18 and the wearing plate 21 on the upper end of the post 19 there is confined a hub 22 of a hand wheel 23. The hub 22 is provided with an interior screw thread fitting the thread on the rod 16.

Let it be supposed that the belt 1 is running horizontally and that the pulley 4 is in engagement with the upper strand of said belt, and that the post 19 rises from the floor. Now, by manipulating the hand wheel 23 in the proper direction, the rod 16 is drawn down into the perforation or socket 20, and the cross head 15 participates in such movement, being prevented from turning by the guides 17, although these guides under some circumstances may be omitted. The pulley 4 is likewise drawn down with the cross head 15 through the rods 8 and 10. But ultimately the belt 1 is put under such tension that it resists further downward movement and then the outturned ends 11 of the rods 10 will act on the springs 13 to compress these springs. This movement continues until such tension has been put on the springs as may be deemed necessary.

Should it transpire that an extra heavy load should be put on the belt 1, the elastic connections will give sufficiently to accommodate the tightener to the tendency of the belt to straighten under the extra load, but, at the same time, the increasing tension of the springs will cause the belt to grip more tightly on the pulley or drive and driven elements. When the load returns to its normal position, the tightener again assumes its original position and the belt is put under the same strain it has been under before. Furthermore, when the belt is running, the tendency of the idler 4 is to move in the direction of travel of the belt, and this is permitted by the hinge connection formed by the eyes 12 and 14. Assuming that the direction of the upper strand of the belt in its travel is toward the right, as viewed in Fig. 1, then the idler will tend to move toward the position shown in dotted lines in Fig. 1. Of course, if the belt be moving in the other direction, then the idler will move toward the left, as viewed in Fig. 1.

The journal boxes 7 may be provided with oil or grease cups 24.

What is claimed is:—

1. A belt tightener comprising a pulley arranged to engage the belt, a tensioning means, and connections between the tensioning means and the pulley, said tensioning means and connections together constituting the sole means for holding the pulley against the action of the belt, and said connections yielding in one direction under the pull of the belt and in another direction under the drag of the belt.

2. A belt tightener comprising a pulley arranged to engage the belt, a tensioning means, connections between the tensioning means and the pulley comprising two relatively movable parts sliding one on the other, a spring interposed between and engaged by both parts, and a hinge connection between the tensioning means and the relatively movable parts carrying the pulley permitting the pulley to move under the drag of the belt in the direction at right angles to the pull of the belt.

3. A belt tightener comprising a pulley arranged to engage the belt, journal boxes for the pulley, double rods on each journal box and having out-turned ends, other double rods one for each of the first-named rods and also having out-turned ends, springs surrounding both rods and confined between the out-turned ends thereof, a cross head, hinge connections between the cross head and second-named double rods, a screw rod carrying the cross head, a hand wheel engaging the screw rod, and means for holding the hand wheel from movement except about its axis of rotation.

In testimony that I claim the foregoing as my own, I have hereto affixed my signature in the presence of two witnesses.

JOSEPH M. SCHINNER.

Witnesses:
C. S. VEDDER,
D. C. GILL.